US005515235A

United States Patent [19]
Stoller

[11] Patent Number: 5,515,235
[45] Date of Patent: May 7, 1996

[54] ELECTRICAL EQUIPMENT ENCLOSURE INCLUDING TRANSFER SWITCH AND LOAD CIRCUIT BREAKER ASSEMBLY

[75] Inventor: Harry R. Stoller, Jefferson Township, N.J.

[73] Assignee: AT&T Corp., Murray Hill, N.J.

[21] Appl. No.: 333,176

[22] Filed: Nov. 2, 1994

[51] Int. Cl.⁶ .................................................. H02B 5/00
[52] U.S. Cl. ........................ 361/605; 361/632; 361/643
[58] Field of Search .............................. 200/50 AA, 400; 361/605–610, 614–615, 622, 632, 640, 643, 650, 679, 724–725, 727–730, 735, 790

[56] References Cited

U.S. PATENT DOCUMENTS

| | | | |
|---|---|---|---|
| 3,647,997 | 11/1970 | Nerem . | |
| 4,206,329 | 6/1980 | Jarosz | 200/50 AA |
| 4,253,003 | 2/1981 | Evans et al. | 200/400 |
| 5,025,171 | 6/1991 | Fanta et al. | 361/605 |

FOREIGN PATENT DOCUMENTS 131502  2/1949  Australia ................................ 361/605

*Primary Examiner*—Gregory D. Thompson
*Attorney, Agent, or Firm*—Lester H. Birnbaum

[57] ABSTRACT

Proposed is an integral transfer switch and load circuit breaker assembly for use in electrical equipment enclosures. The switch and load circuit breakers are mounted to one wall of the enclosure so that the transfer switch handle is located outside the enclosure, while the switch mechanism is inside the enclosure.

3 Claims, 6 Drawing Sheets

5,515,235

ELECTRICAL EQUIPMENT ENCLOSURE INCLUDING TRANSFER SWITCH AND LOAD CIRCUIT BREAKER ASSEMBLY

BACKGROUND OF THE INVENTION

This invention relates to an electrical equipment enclosure such as the type used for housing telecommunications equipment.

In many electrical equipment enclosures, such as the 80-type cabinets for telecommunications equipment, it is desirable to include a transfer switch so that the equipment can be powered by a local generator in the event of a power failure at the public utility. Conveniently, this switch should be accessible from the outside of the cabinet. It is also desirable to include load circuit breakers to prevent damage to the components in the event of a power overload. In typical cabinets, the circuit breakers and transfer switch were provided in separate packages requiring wiring and conduits between the packages. Further, since the cabinet was mounted outdoors, a rainproof enclosure was required to protect the switch. These characteristics added a fair amount of expense to the prior art cabinets.

U.S. Pat. No. 3,647,997 issued to Nerem describes a single switch box or panel for recreational vehicles which includes a transfer switch and circuit breakers.

SUMMARY OF THE INVENTION

The invention is an electrical equipment enclosure for outdoor use comprising an outer housing including at least one wall and an inner housing mounted to the wall so that a first portion of the inner housing extends outside the outer housing and a second portion is enclosed by the outer housing. At least one transfer switch and at least one circuit breaker electrically coupled thereto are included in the second portion. A handle for operating the transfer switch is mounted in the first portion and is mechanically coupled to the transfer switch.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
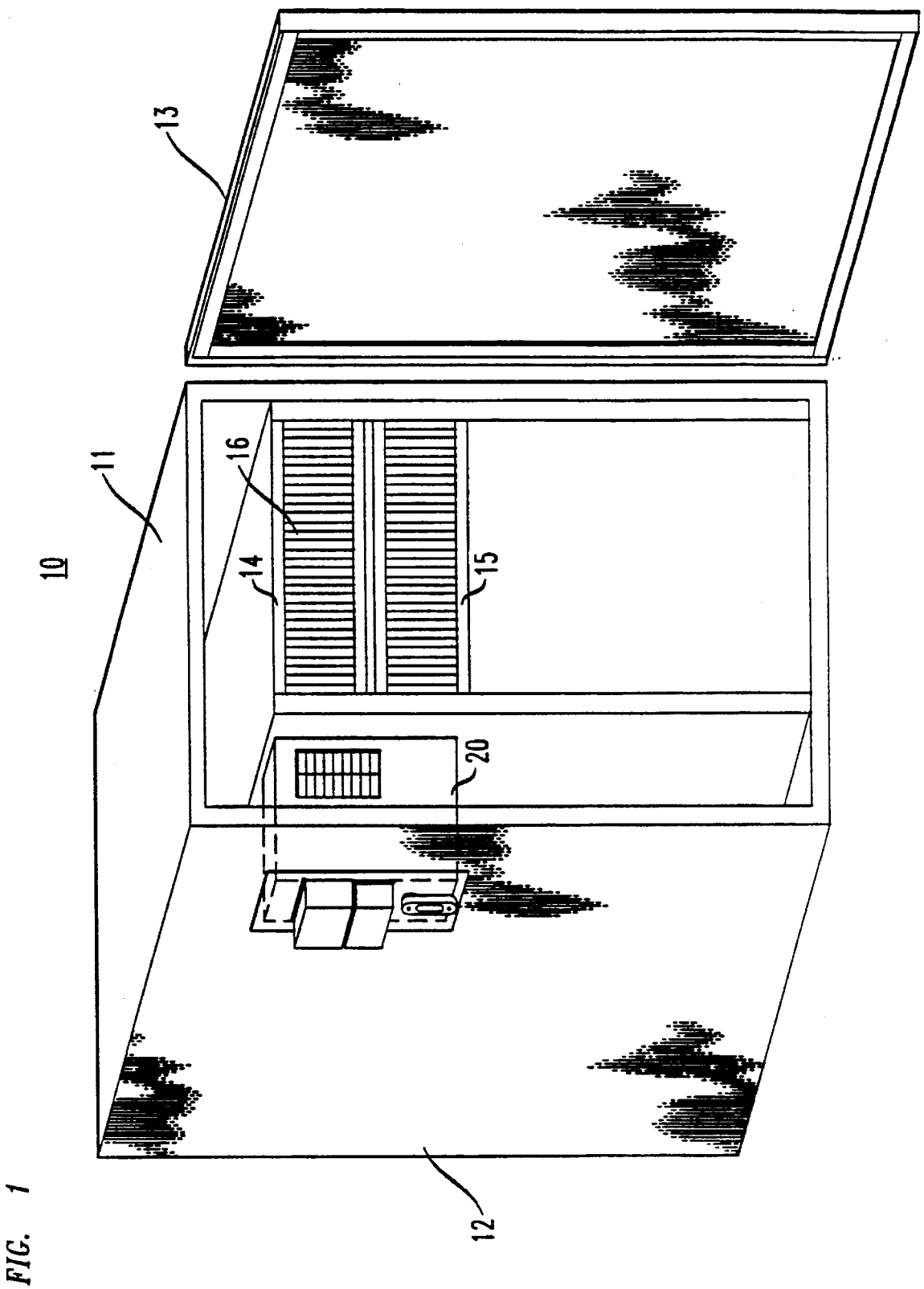
FIG. 1 is a perspective view of an enclosure in accordance with an embodiment of the invention.

FIG. 1 illustrates a typical enclosure, 10, for outdoor use which utilizes the principles of the invention. The enclosure includes an outer housing, 11, which includes side walls, e.g., 12, and a door, 13, for providing access to the inside of the housing. Within the housing, 11, are a plurality of shelves, e.g., 14 and 15, which hold a plurality of circuit packs, e.g., 16. Other electronic components, such as batteries and cooling equipment (not shown), are typically included in a standard outdoor enclosure.

Figure 2:
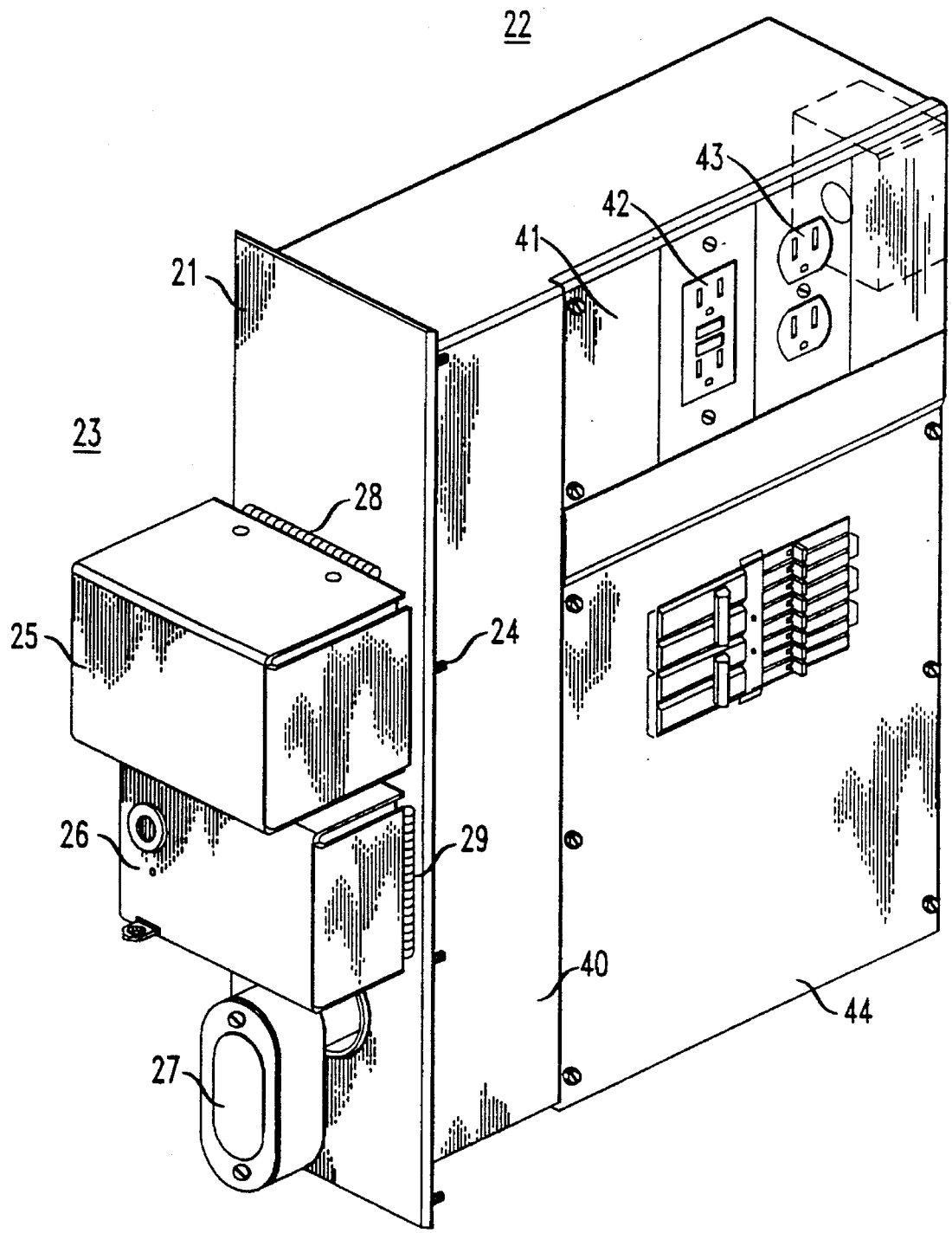
FIG. 2 is an enlarged, more detailed, perspective view of a portion of the enclosure of FIG. 1.

Also included within the outer housing, 11, is an inner housing, 20, which is mounted to one of the side walls, 12, of the outer housing. As shown in more detail in FIG. 2, the inner housing, 20, includes a plate, 21, which attaches to the side wall, 12, of the outer housing, 11, by means of fasteners, such as screws, e.g., 24. The plate, 21, effectively separates the inner housing, 20, into a portion, 22, which is completely enclosed by the outer housing, 11, and a portion, 23, which lies outside the outer housing, 11. Attached to the plate, 21, are two covers, 25 and 26, and a standard pull box, 27, which receives wires (not shown) from the public utility. The covers, 25 and 26, include hinges, 28 and 29, respectively, which allow the covers to swing into an open position (shown in FIGS. 3 and 4). In this example, the top cover, 25, opens in a vertical direction while the bottom cover, 26, opens in a horizontal direction.

Figure 3:
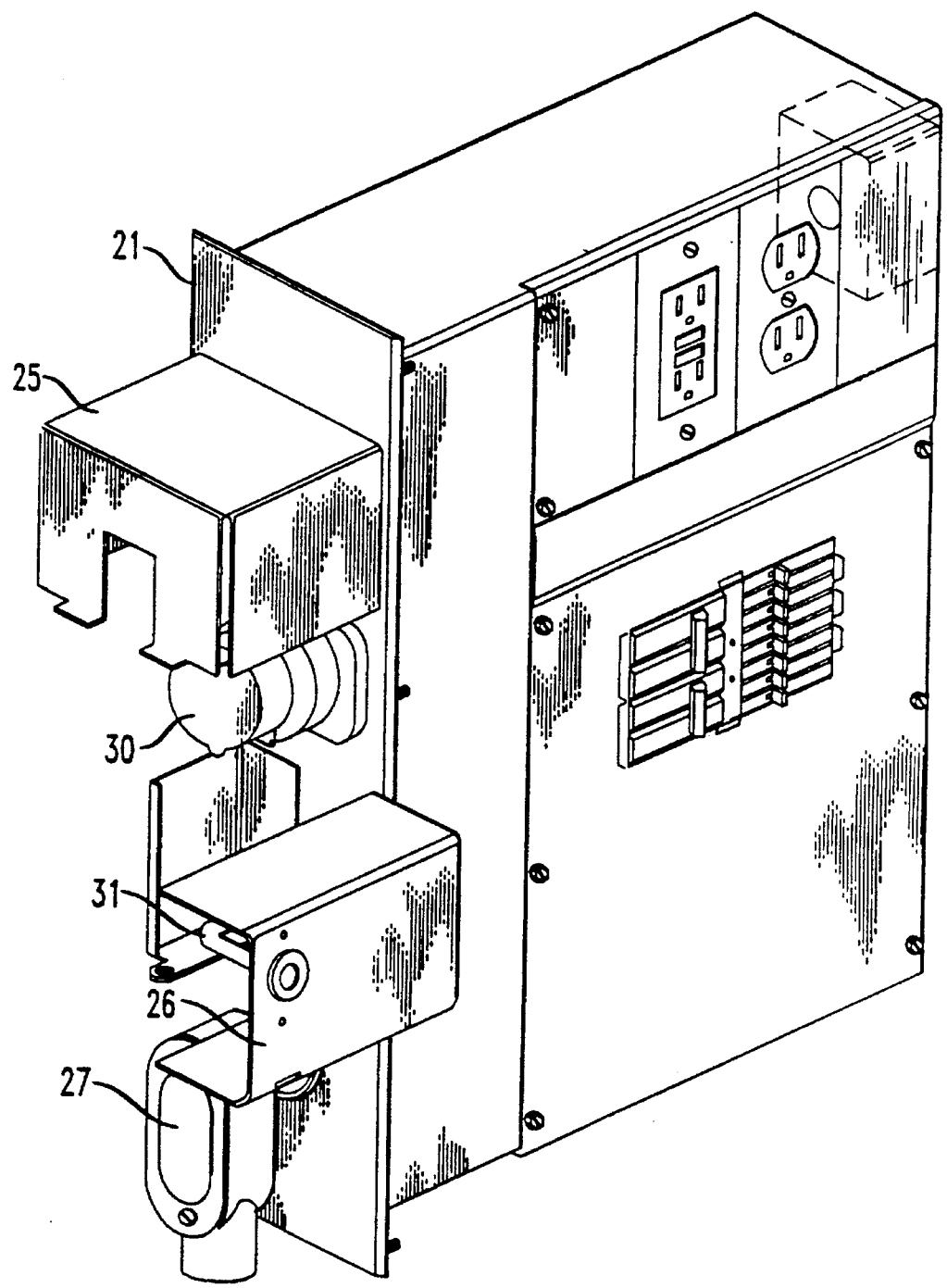
FIG. 3 is a perspective view of the portion shown in FIG. 2 illustrating additional features.
Figure 4:
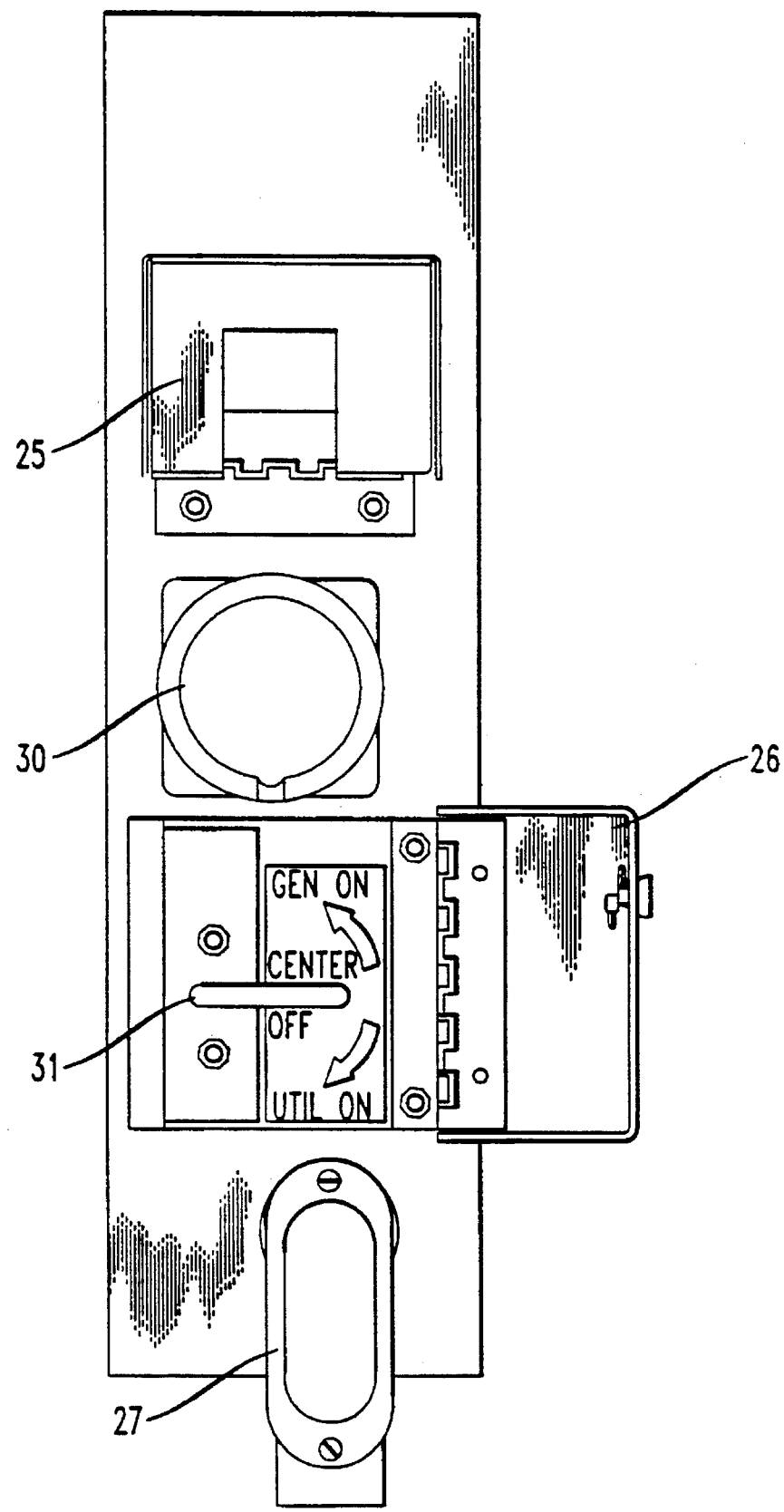
FIG. 4 is a side view of the portion illustrated in FIGS. 2 and 3.

As further illustrated in FIGS. 3 and 4, the cover, 25, protects a generator inlet port, 30, which is mounted to the plate, 21, and which receives wires (not shown) from a local power generator (not shown). The cover, 26, protects a switch handle, 31, which extends through the plate, 21, by means of an aperture including a waterproof seal (32 of FIG. 5). As shown by the indicia in FIG. 4, an upward movement of the handle, 31, couples the enclosure, 10, to the power supplied by the generator wires passing through the inlet, 30, while a downward movement of the handle couples the enclosure to the power supplied by the utility wires passing through pull box 27.

The covers, 25 and 26, are typically made of aluminum, the generator inlet, 30, is made primarily of plastic, and the handle, 31, in this example is made of stainless steel.

Returning to FIG. 2, the portion, 22, of the inner housing, 20, has at least one surface, 40, facing the front of the enclosure, 10. The surface, 40, includes a receptacle panel, 41, to which are mounted a plurality of electrical outlets, 42 and 43. The surface, 40, also includes a removable panel, 44, which provides access to the inside of portion, 22. Protruding from an aperture in panel 44 are the handles for the circuit breakers to be described.

Figure 5:
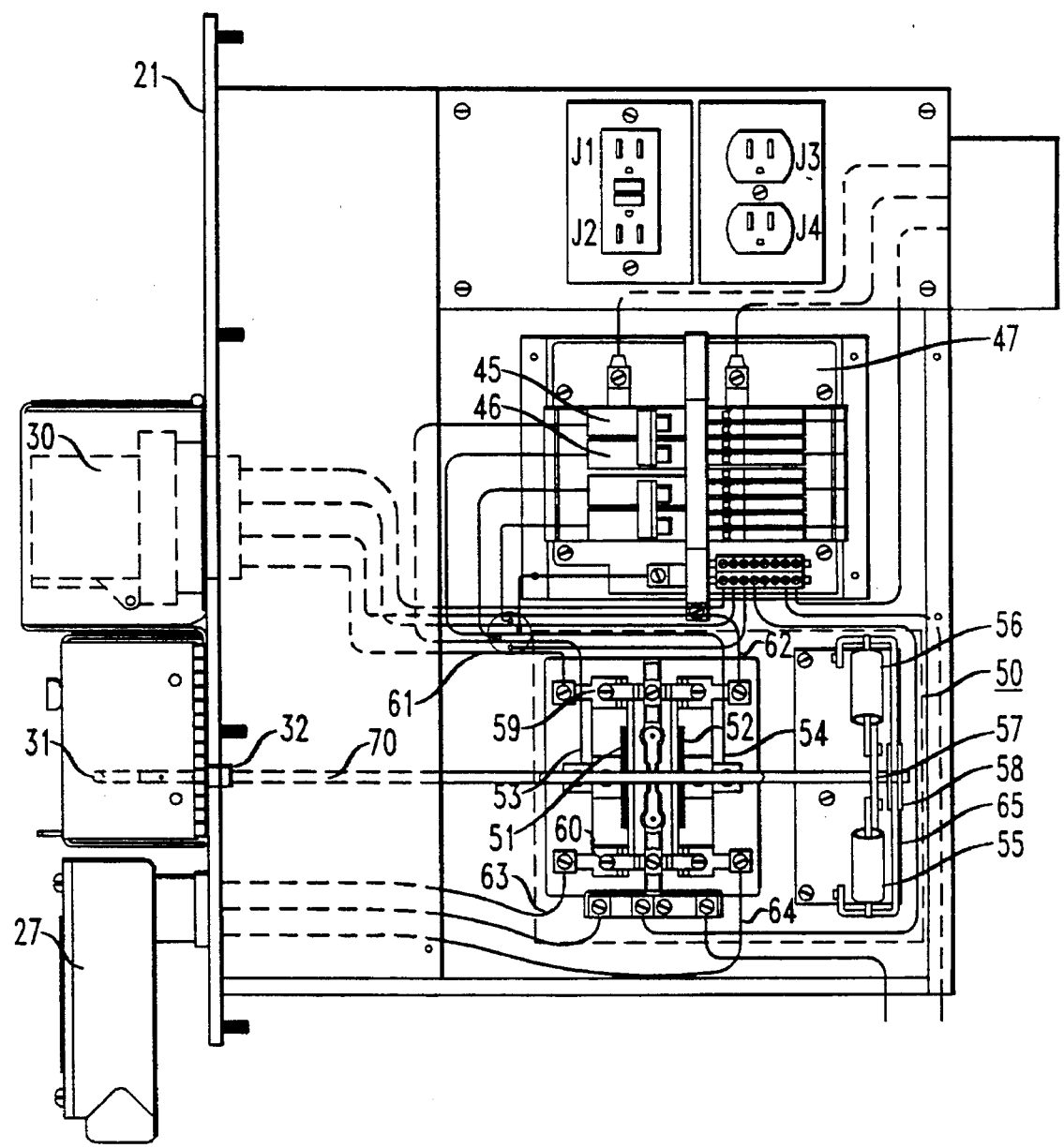
FIG. 5 is a front view, partly cut away, of the portion illustrated in FIGS. 2–4.

FIG. 5 illustrates the inner housing, 20, with the access panel, 44, removed. Within the inner housing is a plurality of load circuit breakers, e.g., 45 and 46, which are of a standard type. The circuit breakers are mounted to a base, 47, which in turn is mounted to the bottom surface of the housing, 20. The circuit breakers, 45 and 46, are electrically coupled to a transfer switch, 50, which is also mounted to the bottom surface of the housing. In particular, the circuit breakers are coupled to respective pairs of blades, 51 and 52, of the switch mechanism by means of wires, 53 and 54. One terminal, 59, of the transfer switch is coupled to a pair of wires, 61 and 62, from the generator inlet, 30, while the other terminal, 60, of the switch is coupled to a pair of wires, 63 and 64, from the pull box, 27.

Figure 6:
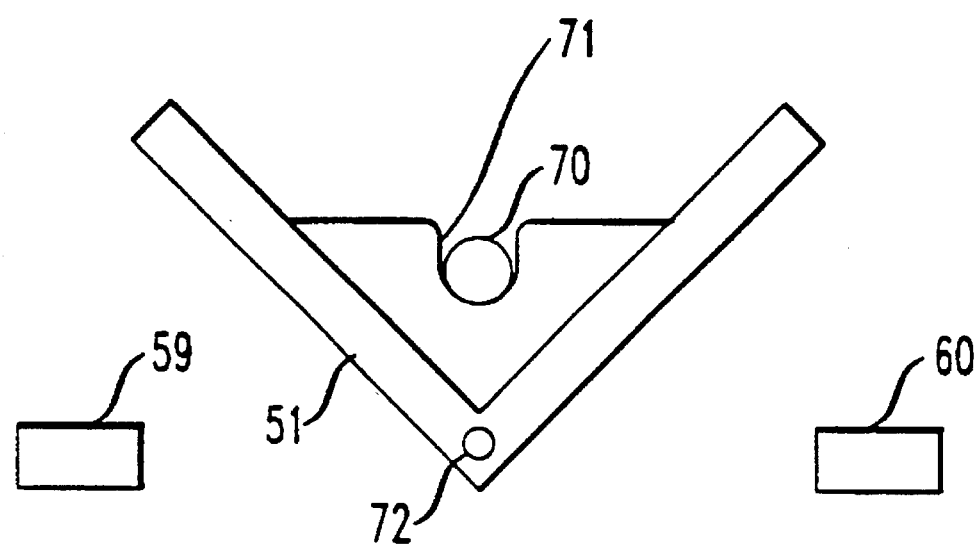
FIG. 6 is a schematic side view of a portion of the enclosure.

The switch handle, 31, is mechanically coupled to the switch mechanism in the inner housing by means of a rod, 70, which extends through a hole, including a seal, 32, in the plate, 21. As further illustrated in the side view of FIG. 6, the rod, 70, is mounted in a slot, 71, in the pair of blades, only one of which, 51, can be seen in this view. It will be appreciated that the switch is in a neutral position in FIG. 6. Since the blades are rotatable about a pin, 72, a rotation of the handle will move the blades into contact with either terminal 59 or 60.

Returning to FIG. 5, the rod, 70, is welded to a cam, 57, which is mechanically coupled to a pair of springs, 55 and 56, one on each side of the rod. These springs aid in the making of the contact with terminals 59 and 60. The end of the rod, 70, is held in place by a retaining clip, 58, which is attached to a bracket, 65.

It will be appreciated that one of the advantages of the present structure is that a separate rainproof cover is not needed for the switch since the switch mechanism is within the portion, 22, of the inner housing which is enclosed by the cabinet, 10. Since the portion, 22, does not have to be water-tight, considerable savings can be realized in the cost of the materials.

Various modifications of the invention will become apparent to those skilled in the art. All such variations which basically rely on the teachings through which the invention has advanced the an are properly considered within the scope of the invention.

I claim:

1. An electrical equipment enclosure for outdoor use comprising:

an outer housing including at least one wall;

an inner housing mounted to the wall so that a first portion of the inner housing extends outside the outer housing and a second portion is enclosed by the outer housing;

an inlet for receiving wires from a generator, and a pull box for receiving wires from a public utility mounted in the first portion;

at least one transfer switch and at least one circuit breaker electrically coupled thereto mounted within the second portion; and a handle for operating the transfer switch, said handle mounted in the first portion and mechanically coupled to the transfer switch.

2. An enclosure according to claim 1 wherein the first and second portions are separated by a plate which is mounted to the wall of the outer housing.

3. An enclosure according to claim 2 wherein the handle is coupled to the transfer switch by means of a rod which extends through an aperture including a seal in the wall of the plate.

* * * * *